(12) United States Patent
Johansson et al.

(10) Patent No.: US 8,734,959 B2
(45) Date of Patent: May 27, 2014

(54) BARRIER MATERIAL AND METHOD FOR MAKING THE SAME

(75) Inventors: Caisa Johansson, Karlstad (SE); Lars Järnström, Uppsala (SE); Christopher Breen, South Yorkshire (GB)

(73) Assignees: Caisa Johansson, Karlstad (SE); Lars Jarnstrom, Uppsala (SE); Sheffield Hallam University, Sheffield South Yorkshire (GB)

( * ) Notice: Subject to any disclaimer, the term of this patent is extended or adjusted under 35 U.S.C. 154(b) by 319 days.

(21) Appl. No.: 13/139,814

(22) PCT Filed: Dec. 21, 2009

(86) PCT No.: PCT/SE2009/051469
§ 371 (c)(1),
(2), (4) Date: Aug. 22, 2011

(87) PCT Pub. No.: WO2010/077203
PCT Pub. Date: Jul. 8, 2010

(65) Prior Publication Data
US 2011/0293957 A1 Dec. 1, 2011

(30) Foreign Application Priority Data
Dec. 30, 2008 (SE) ..................... 0802677

(51) Int. Cl.
*B32B 23/04* (2006.01)
(52) U.S. Cl.
USPC ............................ 428/532; 428/402; 428/403
(58) Field of Classification Search
USPC ......................... 428/402, 403, 532
See application file for complete search history.

(56) References Cited

U.S. PATENT DOCUMENTS 5,288,318 A * 2/1994 Mayer et al. ............... 106/126.3

FOREIGN PATENT DOCUMENTS

| EP | 1736504 | | 12/2006 |
|---|---|---|---|
| EP | 1860138 | * | 11/2007 |
| EP | 1860138 A1 | | 11/2007 |
| WO | 0040404 | | 7/2000 |
| WO | 03078734 | | 9/2003 |
| WO | 2006055504 A2 | | 5/2006 |
| WO | WO2006055504 | * | 5/2006 |

OTHER PUBLICATIONS

Hm. Wilhelm, Polymer International, "The influence of . . . " 2003, 52, pp. 1035-1044.*
Park, JOMS "Environmentally friendly . . . ", 2003, 38(5), pp. 909-915.*
International Search Report and Written Opinion (mailed Apr. 13, 2010).
International Preliminary Report on Patentability (completed Apr. 12, 2011).
Second Written Opinion (mailed Jul. 2, 2010) and Third Written Opinion (stamped Jan. 28, 2011).
Park, Environmentally friendly polymer hybrids. Part 1. Mechanical, thermal, and barrier properties of thermoplastic starch/clay nanocomposites, Journal of Materials science, 2003, vol. 38, pp. 909-915.
Wilhelm, The influence of layered compounds on the properties of starch/layered compound composites, Polymer International, 2003, vol. 52, pp. 1035-1044.
Sorrentino, Potential perspectives of bio-nanocomposites for food packaging applications, Trends in Food Science and Technology, 2007, vol. 18, pp. 84-95.
Anderson, New Ways to Enhance the Functionality of Paperboard by Surface Treatment—a Review, Packaging Technology and Science, 2002, vol. 21, pp. 339-373.
Thang, X, Alavi, S and Herald, T, (Carbohydrate Polymers 74 (2008) 552-558 [available online Apr. 22, 2008.
Kampeerapappum, P, Aht-ong, D, Pentrakoon, D and Srikulkit, K, (Carbohydrate Polymers 67 (2007) 155-163 [available online Jun. 23, 2006.
Cyras, VP, Manfredi, LB, Ton-That, M-T and Vazquez, A, (Carbohydrate Polymers 73 (2008) 55-63 [available online Nov. 22, 2007.
Office Action issued in Chinese Application No. 2013120500966630 on Dec. 10, 2013, pp. 1-3.

* cited by examiner

*Primary Examiner* — Leszek Kiliman
(74) *Attorney, Agent, or Firm* — Jeffrey S. Melcher; Manelli Selter PLLC (57) ABSTRACT

The present invention relates to a biopolymer based barrier coating composition wherein said biopolymer based barrier coating composition comprises a plasticizer, a nano-sized clay and a biopolymer comprising a native starch and/or a de-graded starch and/or a chemically modified starch. The present invention also relates to a method for preparing the biopolymer based barrier coating composition as well as to a method for coating a cellulose based substrate with the biopolymer based barrier coating composition. Finally, the present invention relates to a cellulose based substrate coated with said biopolymer based barrier coating composition.

23 Claims, 3 Drawing Sheets

BARRIER MATERIAL AND METHOD FOR MAKING THE SAME

CROSS-REFERENCE TO RELATED APPLICATIONS

This application is a national stage entry under 35 U.S.C. 371 of International Application No. PCT/SE2009/051469, filed 21 Dec. 2009, designating the United States. This application claims foreign priority under 35 U.S.C. 119 and 365 to Swedish Patent Application No. 0802677-5, filed 30 Dec 2008. The complete contents of these applications are incorporated herein by reference.

TECHNICAL FIELD OF THE INVENTION

The present invention relates to biopolymer based barrier coating compositions with improved properties for providing barrier coatings on cellulose based substrates, e.g. paper and paperboard, as well as paper and paperboard provided with such coating.

It also relates to a method for preparing a biopolymer based barrier coating composition and to a method for preparing cellulose based substrates with barrier properties.

BACKGROUND OF THE INVENTION

Barrier coatings are used in paper and paperboard packaging to provide barrier properties to paper and paperboard by reducing or eliminating the permeability of gases through the material and/or the absorption of liquids in the fiber structure.

Barrier coatings are required to prevent the egress from the package of flavors, aromas and other ingredients of the packaged product as well as to prevent the ingress into the package of oxygen, moisture, grease and other contaminants that might deteriorate the quality of the packaged product. Oxygen and water vapour are the gases for which barriers are normally tested but the barriers are useful for other gases as well, including carbon dioxide.

Various coatings have been applied to paper or paperboard substrates to provide composite materials that may be used for various purposes. Polymer dispersions or latexes have become attractive in recent years as a replacement for petroleum-based plastics for use as barrier materials. Barrier dispersions can be applied using conventional coating techniques, both online and off-line. Common applications of dispersion coatings are corrugated board, sacks, disposables, frozen and chilled food cartons, ream wrappings for copy paper, electronic packages and wallpaper base. The most commonly used latexes consist of polymers or copolymers of styrene, butadiene, acrylates, vinyl acetate and polyolefins dispersed in water. Several additives are used to reach the desired level of consistency, durability and runnability, e.g. colloidal stabilizers, thickeners, waxes, antifoaming agents, biocides and pesticides.

There is a need for biopolymer based barrier-coating compositions which are easy and inexpensive to produce, which have good barrier properties with respect to moisture, gas and grease and which have low brittleness. There is also a need for barrier coating compositions which can easily be separated from the cellulose fibres in recycling and repulping processes.

Natural polymers or biopolymers that come from renewable sources show many interesting properties in terms of film forming ability and resistance to oxygen and grease. However, the moisture sensitivity of biopolymers makes them inappropriate as barrier films for food packaging applications.

Another disadvantage of barriers based on natural polymers is the brittleness of the coatings, i.e. the sensitivity of barrier properties to mechanical stress applied in converting operations. Cracking of the barrier film causes the barrier properties to be lost.

The patent document WO 00/40404 describes coated films with improved barrier properties and relates to coating compositions which use a polymeric binder and a nano-scale particle size additive to provide improved moisture barriers. The area concerned is thermoplastic films and the coating compositions are suited for application to polypropylene and polyethylene films in order to improve the barrier characteristics of said polypropylene and polyethylene films and thereby making them acceptable for food packaging applications. The polymers used are not biopolymers and the intention is not to replace petroleum-based plastic films with more environmentally friendly coatings that provide sufficient barrier protection to paper or paperboard.

The patent document EP 1 736 504 describes improvement of barrier properties of a water soluble gas barrier material by adding nanoparticles of calcium carbonate. The polymers used are synthetic polymers and not biopolymers and the purpose is to improve oxygen barrier properties, not water vapour barrier properties.

The patent document WO 03/078734 describes a composition for surface treatment of paper by use of nanoparticles of synthetic layered silicates or precipitated calcium carbonate in a carrier fraction comprising plate-like pigment particles (talc and/or kaolin) and a binder such as a polymer latex (styrene-butadiene). The purpose is to improve the printing properties of paper, not to provide paper with improved barrier properties. Starch is mentioned as a surface sizing agent in order to improve the strength of the paper surface.

A study by Thang, X, Alavi, S and Herald, T, (Carbohydrate Polymers 74 (2008) 552-558 [available online 22 Apr. 2008]) considers corn starch with glycerol (0-20 wt %), urea (15 wt %) or formamide (15 wt %) as plasticizer. Montmorillonite clay is added to 6 wt %. Both the plasticizer and especially the clay concentrations are lower than in our 'most preferred' formulation. Furthermore, the materials were mixed by a twin-screw extruder, followed by grinding and dispersion of the ground material in water. Finally, the water dispersion was cast to self-supporting films. The WVTR was measured at 25° C. and 75% RH.

A study by Kampeerapappum, P, Aht-ong, D, Pentrakoon, D and Srikulkit, K, (Carbohydrate Polymers 67 (2007) 155-163 [available online 23 Jun. 2006]) refers to cassava starch in combination with chitosan (0-15% of the dry amount of starch). Chitosan is used as a compatibilizing agent to get a homogeneous dispersion of montmorillonite clay in the starch matrix. Clay was added at a concentration of 0-15 wt % of the dry amount of starch. Glycerol was used as a plasticizer. Self-supporting films with a thickness of about 70 μm were cast from the aqueous dispersion. WVTR was measured at 38° C. and 90% RH and values of 1000-2000 $g/m^2 \cdot d$ were reported. These values are 10-20 times higher than for paper coatings, measured under the same conditions (Example 6 below).

In a study by Cyras, V P, Manfredi, L B, Ton-That, M-T and Vázquez, A, (Carbohydrate Polymers 73 (2008) 55-63 [available online 22 Nov. 2007]) native starch (not chemically modified) is used in combination with 0-5 wt % Na-Cloisite. Self-supporting films were cast from water solution and the resulting film thickness was 250 μm. The equilibrium water uptake and water absorption rate was measured, but the article do not report any measurement of water vapour barrier properties.

SUMMARY OF THE INVENTION

It is an object of the present invention to overcome or at least minimize at least one of the drawbacks and disadvantages of the above described prior art. This can be obtained by providing barrier coatings based on natural polymers with improved barrier properties for coating of cellulose based substrates, e.g. paper and paperboard.

The barrier coatings of the present invention are easily applied as water-borne dispersions on paper and paperboard, are environmentally safe, have excellent film-forming properties and has competitive barrier properties with respect to oxygen, grease and moisture. The barrier films formed by the applied dispersion show an intermediate brittleness and therefore some resistance to mechanical stress.

Starch from potato is an example of a biobased polymer with several interesting features. It is renewable, highly available at low price, approved for food contact and has potential for chemical modification. Starch can be native starch, degraded and/or chemically modified.

Chemically modified starch can easily be applied as water-borne dispersions on paper and paperboard and shows excellent film-forming properties. The film formed has in general good resistance to grease and oxygen but is highly moisture sensitive.

In the present invention oxidized, hydroxypropylated potato starch was chosen as the biopolymer. Other possible biobased polymer materials could be starch from other plant sources (e.g. wheat or corn); starch with other types of chemical modification, or cellulose derivatives.

It has been found that addition of nanoparticles are very helpful in lowering the moisture sensitivity of the barrier film. In nanotechnology, a particle is defined as a small object that behaves as a whole unit in terms of its transport and properties. It is further classified according to size. Nanoparticles have one dimension in the range between 1 and 100 nanometers and may or may not exhibit size-related properties that differ significantly from those observed in fine particles or bulk materials. Although the size of most molecules would fit into the above outline, individual molecules are usually not referred to as nanoparticles.

Nanoparticles are, in the present invention, defined as having a size below 100 nm and can be either inorganic (silicates, metal oxides) or organic (polymers, dyes). In the present invention nano-sized clay particles, hereinafter called nanoclay, have been investigated.

Clay is a generic term which encompasses a well-documented range of minerals; some pertinent examples of which include the kaolinite group, the talc group, the smectite group (which includes montmorillonite, hectorite, saponite and their associated impurities), the vermiculite group, the illite group, the chlorite group and the mica/brittle mica group. It is important to recognize the important group called bentonites. Bentonites are impure smectites, particularly montmorillonite, which contain ancilliary minerals such as quartz, cristabolite, feldspar, mica, illite, calcium carbonate and titania. Commercial bentonites are the most common source of montmorillonite which is a layered clay mineral with an aluminosilicate structure having a hydrophilic character. Through surface modification, swelling clays can be made organophilic, which makes them more compatible and more easily dispersible in organophilic polymers. The process replaces the naturally occurring $Na^+$-ions in the swelling clay galleries with organic cations, e.g. alkylammonium or alkylphosphonium (onium) surfactants.

The nanoclays used in the present invention have ion exchange capacities and belong to the bentonite type of clays, more precisely sodium montmorillonite and calcium montmorillonite and blends thereof. Other possible nanoclays would be multivalent- or organic cation exchanged grades and inorganic cation-exchanged clays, as well as other clays which can be purified and suitably ion exchanged, all of which are available from commercial suppliers and as samples or gifts from deposits from all around the world.

The relationship between surface diameter and thickness of the nanoclay particles is defined as the aspect ratio. Typically, commercial nanoclays have aspect ratios between 50 and 1000, which is much larger than for typical clay pigments (10-30) used in conventional paper or paperboard coating. The large aspect ratio of nanoclays makes them effective for barrier improvement even at very low (≤5% by weight) concentrations. Higher weight additions may be difficult from a processing perspective, because the viscosity of the dispersions increases significantly at increased loads of clay. The use of nanoparticles in paper and paperboard coating is thus advantageous, particularly given that less material is required (thinner coating layers) to reach the desired barrier or mechanical properties. Less material use leads to reduced costs and reduced amounts of waste.

However, a disadvantage with the addition of nanoclay is that nanoclay exacerbates the brittleness of the film. To overcome the problems with brittleness of starch films and cracking of the barrier film it has been found that addition of plasticizers to the barrier composition increases the film flexibility and maintains the protective properties. The barrier and mechanical properties are however strongly affected by the nature and amount of the plasticizer. It has also been found that the relative proportions between chemically modified starch, nanoclay and plasticizer can be adjusted to meet the requirements set on processability of the formulation for industrial scale application.

The plasticizer molecules (often short-chain, low-molecular-weight polymers or oligomers) arrange themselves between the polymer chains such that the intermolecular hydrogen bonding is disrupted, hence giving films with less stiffness. The most commonly used plasticizer for starch and proteins is glycerol. Other hydrophilic plasticizers include sorbitol, polyethylene glycol (PEG) and polypropylene glycol (and mixtures thereof), polyvinyl alcohol (PVOH), amino acids, amides, di- and triethanolamine. Organophilic (hydrophobic) plasticizers, such as diacetin, triacetin and tributyrin, can also be used. The plasticizer can also be a mixture including both hydrophilic and organophilic plasticizers. The plasticizer not only affects the properties of the polymer matrix, it also interacts with the clay particles and thereby influences their orientation in the coating layer.

Multilayer coating is more effective than just increasing the coat weight. The coverage of the substrate surface is increased by multilayer coating. Calendering of the paper or paperboard improves the barrier properties by elimination of coating defects.

The biopolymer barrier coating dispersion can be applied on uncoated surfaces as well as on pre-coated surfaces which consist of a pigment coating, a biopolymer based coating, a dispersion barrier coating or laminates thereof.

The ordering of clay platelets in the coating is affected by plasticizer type, application strategy and post-treatment and will affect the final barrier properties.

BRIEF DESCRIPTION OF THE DRAWINGS

The invention will in the following be described more detailed with reference to the appended drawings, in which.

DETAILED DESCRIPTION

The following description is of the best mode for practicing the invention. The description is not to be taken in a limiting sense, but is made merely for the purpose of describing the general principles of the invention. The scope of the invention should be ascertained with reference to the issued claims.

The present invention describes the performance of water-based coating formulations of oxidized, hydroxypropylated starch, henceforth called OHP starch, plasticized with glycerol or polyethylene glycol or sorbitol or triacetin to which different loads of sodium montmorillonite and/or calcium montmorillonite has been added. The plasticizer was added to reduce the brittleness of the coating. The goal is to get an aqueous coating suspension which has an appropriate viscosity for use in conventional coating applicators. Applying the water-based composition on the paper or paperboard surface comprises the steps of preparing an aqueous based dispersion comprising a biopolymer, a plasticizer and a nanoclay; coating the cellulose based substrate with the dispersion and allowing the dispersion to dry on the substrate.

The sodium montmorillonite and calcium montmorillonite used in the present invention have the trade names Na-Cloisite and Ca-Cloisite, respectively, and will be the terms henceforth used.

EXAMPLE 1

Effects of Chemicals on Formulation Viscosity

Na-Cloisite was dispersed in deionized water in a dispergator using a Cowles propeller operated at a speed of 1000 rpm. Two different concentrations of clay were used: 1) low concentration to get a completely delaminated clay, 2) higher concentration to get as high solids content as possible in the formulations. The viscosity was measured by a Brookfield viscometer operated at 100 rpm (Table 1).

TABLE 1

Dispersion of Na-Cloisite in water.

| Na-Cloisite | Solids, % | Viscosity, mPas |
|---|---|---|
| Dispersion 1 | 4.7 | 64 |
| Dispersion 2 | 9.5 | 4710 |

Due to the formation of a thick paste at high loads of clay, 9.5% by weight indicates the upper concentration limit of a Na-exchanged clay but not necessarily the upper concentration limit of other clay with other cations (both inorganic and organic) on the exchange sites.

OHP starch was cooked to 20% concentration.

Glycerol was used as plasticizer and was added to the cooked starch at a constant level of 30 parts per 100 parts of OHP starch on dry basis. Na-Cloisite dispersion 1 or 2 was added at various amounts and the suspensions were mixed by a propeller rotor operated at 500 rpm for 20 minutes.

The relative proportions between OHP starch, plasticizer and nanoclay were adjusted to reach a viscosity within the range of 500-2000 mPas, which may be an appropriate viscosity for coating runnability with various coating techniques, while keeping the overall solids content at the highest possible level (Table 2).

TABLE 2

Relative proportions of Na-Cloisite-OHP starch-plasticizer and effects on formulation viscosity.

| Content, % of dry matter | | | Total | Viscosity, |
|---|---|---|---|---|
| Na-Cloisite | OHP starch | Glycerol | solids, % | mPas |
| 25.2 | 58.0 | 16.8 | 20.4 | 6510 |
| 23.0 | 51.1 | 25.9 | 19.8 | 2900 |
| 15.4 | 65.1 | 19.5 | 14.6 | 2230 |
| 27.3 | 55.9 | 16.8 | 11.7 | 1200 |
| 37.5 | 39.3 | 23.2 | 10.5 | 850 |
| 23.0 | 48.5 | 28.6 | 8.6 | 240 |

As can be seen from Table 2, row 4 shows the best result resulting in a viscosity within the viscosity range of 500-2000 mPas.

The amount of total solids decreases with increasing addition of dispersion of Na-Cloisite as a result of the addition of more water to the composition.

A water dispersion of Na-Cloisite with 9.5 wt % clay was used in the first five experiments and the results are shown in rows 1-5, Table 2.

A water dispersion of Na-Cloisite with a lower content of clay (4.7 wt % clay) was used in the experiment which results are shown in row 6, Table 2. Since the content of clay in the water dispersion of Na-Cloisite was low the dispersion contained more water than the dispersions used in the first five experiments. The low content of clay led to a low content of total solids causing a very low viscosity (240 mPas). In both the experiments with results shown in rows 2 and 6, the content of Na-Cloisite was 23.0 wt % of dry matter. Despite of this the viscosities varied much due to the difference in total solids.

Further, Table 2 shows that even small variations in total solids results in large variations in viscosity, e.g. a comparison of the results in rows 1 and 2 shows a difference in total solids of 0.6% resulting in a difference in viscosity of 3610 mPas. It is understood from Table 2 that the proportions of the Na-Cloisite-OHP starch-plasticizer and the amount of total solids have a very big influence on the viscosity. It is of great importance to find out the optimal proportions in order to get a viscosity within the range of optimal viscosity for coating runnability.

EXAMPLE 2

Effect of Plasticizer Type and Concentration

Glycerol and polyethylene glycol (PEG) were used as plasticizers and were added at levels of 10, 20 and 30 parts per 100 parts of OHP starch on dry basis.

A water dispersion of Na-Cloisite (with 9.5 wt % clay) was used. The nanoclay dispersion was mixed into the starch-plasticizer solutions while keeping the temperature at 60° C. using a hotplate. Table 3a shows the total solids content, the relative concentrations of Na-Cloisite, OHP starch and plasticizer (as percentages of dry matter) and the resulting Brookfield viscosities (confer Table 2).

TABLE 3a

Viscosity and water vapour transmission rate (WVTR) for formulations of OHP starch-Na-Cloisite as a function of plasticizer type and concentration.

| Plasticizer, pph | Total solids, % | Content, % of dry matter | | | | Viscosity, mPas | WVTR, g/m²·d | d001 Å | d001 Å |
|---|---|---|---|---|---|---|---|---|---|
| | | Na-Cloisite | OHP starch | Glycerol | PEG | | | | |
| 0 | 20.0 | 0 | 100 | 0 | 0 | 1150 | 295 ± 5 | n/a | n/a |
| 10 | 18.5 | 29.7 | 63.9 | 6.4 | — | 1790 | 110 ± 6 | 27.6 | 21.0 |
| 20 | 19.6 | 28.3 | 59.7 | 12.0 | — | 1710 | 91 ± 4 | 27.6 | 20.0 |
| 30 | 20.4 | 25.2 | 58.0 | 16.8 | — | 1800 | 83 ± 8 | 21.0 | 12.6 |
| 10 | 17.8 | 29.6 | 63.9 | — | 6.5 | 1710 | 74 ± 6 | 13.8 | — |
| 20 | 19.4 | 28.3 | 59.7 | — | 12.0 | 1670 | 27 ± 1 | 15.5 | — |
| 30 | 21.2 | 27.1 | 56.0 | — | 16.9 | 1750 | 39 ± 2 | 15.5 | — |

Brookfield viscosities at 100 rpm were recorded at a temperature of 60° C. Data for pure OHP starch is shown for comparison.

A viscosity minimum was found at the intermediate plasticizer level (20 pph) and the viscosity values obtained are below target maximum level of 2000 mPas. Slightly lower viscosities were obtained with polyethylene glycol than with glycerol at all plasticizer levels.

Based on these data, a OHP starch-plasticizer-nanoclay composition should preferably consist of 20-40 wt % nanoclay, 50-70 wt % OHP starch and 5-30 wt % plasticizer.

When using other nanoclays with other cations the of content of nanoclay in the coating composition may be as high as 70 wt %.

Laboratory Coating

All formulations were coated on a packaging board using a laboratory bench coater fitted with a wire-wound rod. All coated substrates were dried in 105° C. for 2 minutes.

Water Vapour Transmission Rate, WVTR

The water vapour transmission rate, WVTR, is defined as the amount of water vapour that is transmitted through a unit area in a unit time under specified conditions of temperature and humidity. Common standards for measurement of WVTR by the gravimetric method are ASTM E 96, DIN 53122-1, ISO 2528, TAPPI T 448 and T 464. The WVTR of coated paperboard materials generally decreases exponentially with increased coating layer or film thickness. Permeation will mainly take place through coating defects such as cracks, voids and pinholes or through the amorphous regions of polymer films. Packaging of foodstuff with intermediate requirements on moisture protection typically have a critical level of WVTR below 10 g/m²·d. Materials having WVTR below 1 g/m²·d are considered as good moisture barrier whereas materials having WVTR above 50 g/m²·d are commonly regarded as poor barriers. Measurements of WVTR were carried out with the gravimetric cup method in an environment of 23° C. and 50% RH using silica gel as desiccant and the coated sides exposed to the humid air.

WVTR data is presented in Table 3a. All formulations containing Na-Cloisite showed a significant decrease in WVTR compared to the reference OHP starch coating.

At all plasticizer levels, the formulations containing polyethylene glycol showed lower WVTR values than those containing glycerol. This may partly be due to the hygroscopic character of the latter. A minimum in WVTR was observed at 20 pph PEG.

The effect of a hydrophobic plasticizer (triacetin) and a potentially less hygroscopic, hydrophilic plasticizer (sorbitol) on the WVTR values were also evaluated. Coating and measurement of WVTR was carried out as above. The coating compositions and corresponding WVTR values are shown in Table 3b.

TABLE 3b

Water vapour transmission rate (WVTR) for formulations of OHP starch-Na-Cloisite as a function of plasticizer type and concentration.

| Plasticizer, pph | Total solids, % | Content, % of dry matter | | | | WVTR, g/m²·d |
|---|---|---|---|---|---|---|
| | | Na-Cloisite | OHP starch | Sorbitol | Triacetin | |
| 10 | 17.8 | 29.6 | 63.9 | 6.5 | — | 61 ± 5 |
| 20 | 19.4 | 28.3 | 59.7 | 12.0 | — | 40 ± 4 |
| 30 | 21.2 | 27.1 | 56.0 | 16.9 | — | 25 ± 5 |
| 10 | 17.8 | 29.6 | 63.9 | — | 6.5 | 54 ± 1 |
| 20 | 19.4 | 28.3 | 59.7 | — | 12.0 | 49 ± 5 |
| 30 | 21.2 | 27.1 | 56.0 | — | 16.9 | 38 ± 7 |

Both these plasticizers were more effective in reducing the WVTR, as compared to glycerol, when used in combination with OHP starch and Na-Cloisite (confer Table 3a). A higher concentration of sorbitol (30 pph) was required to reach the same level of WVTR as was obtained with 20 pph of polyethylene glycol.

X-Ray Diffraction Pattern of Coated Paper

Figure 1:
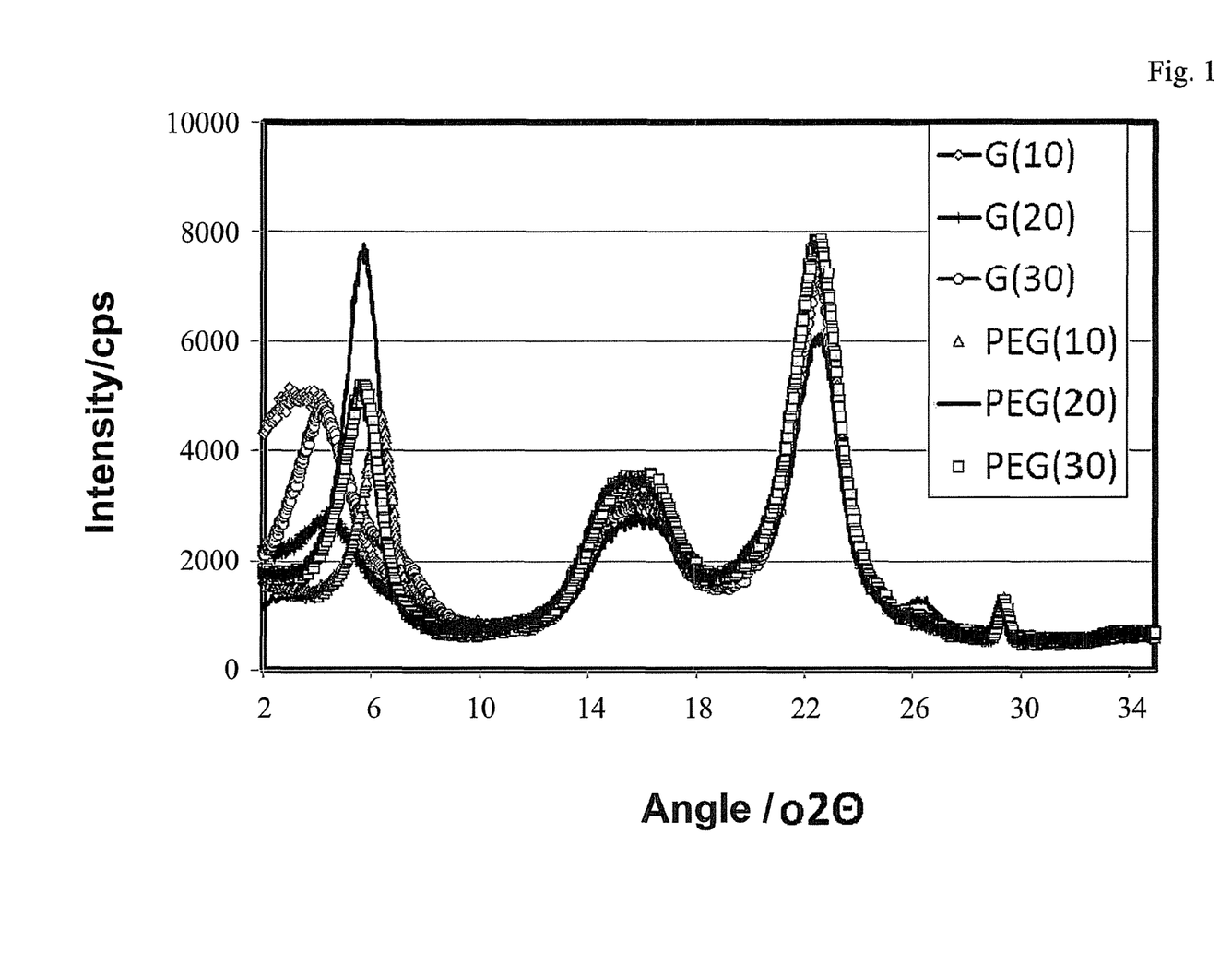
FIG. 1 shows XRD patterns for the coated samples presented in Table 3a. The sample designation G refer to glycerol and PEG to polyethylene glycol. The values within brackets are the concentration of plasticizer in pph.

The barrier properties of nanoclay reinforced coatings are strongly affected by the ordering of the clay particles within the polymer matrix. The gallery spacings between clay particles as an effect of plasticizer type and concentration was therefore analyzed by studying the X-ray Diffraction patterns (XRD) for coated paperboard samples. FIG. 1 presents the x-ray traces for the six samples in Table 3a. These samples all displayed relatively sharp, intense x-ray peaks when using the peak intensities from the paper, at 2Θ values near 16 and 22.5°, as a comparative standard (2Θ refers to the angle between the incident and diffracted x-ray beam). Note that some of the peaks near 5 °2Θ exhibited two poorly resolved peaks. The position of these peaks was used to calculate the d-spacings presented in the two right hand columns in Table 3a.

The XRD traces in FIG. 1 illustrate the considerable differences in clay particle ordering and gallery spacing in the presence of PEG compared with glycerol. The broad, weak peaks displayed by the coatings prepared using glycerol suggest that the platelets are poorly ordered with respect to each other, whereas the narrow, intense peaks displayed by the samples containing PEG indicate that the clay platelets are well-aligned with respect to each other and oriented with their basal surface parallel to the paper surface.

The d-spacings of the clay in different coatings are shown in the last two columns in Table 3a. The last three samples prepared using PEG, exhibited sharp, intense peaks with d-spacings of 13.8, 15.5 and 15.5 Å, respectively, whereas the samples prepared using glycerol exhibited broader peaks to lower angle indicating more than one gallery spacing.

Thus the combination of the WVTR and XRD results indicate that the particular combination of OHP starch-nanoclay-plasticizer used resulted in a very uniform coating which formed on the surface of the paper web. For this reason when the amount of plasticizer exceeds a lower limit (i.e. above 10 pph) the clay becomes uniformly expanded and very well aligned. These aligned stacks of clay particles may help counteract the influence of the deepest depressions in the underlying paper web, encouraging the coating to 'hold out' from absorption into the paper web. These aligned clay stacks also appear to increase the tortuosity of the path through the coated paper, thus contributing to an improved barrier to moisture and other gases.

EXAMPLE 3

Effect of Mixing Sequence of the Components

Figure 2:
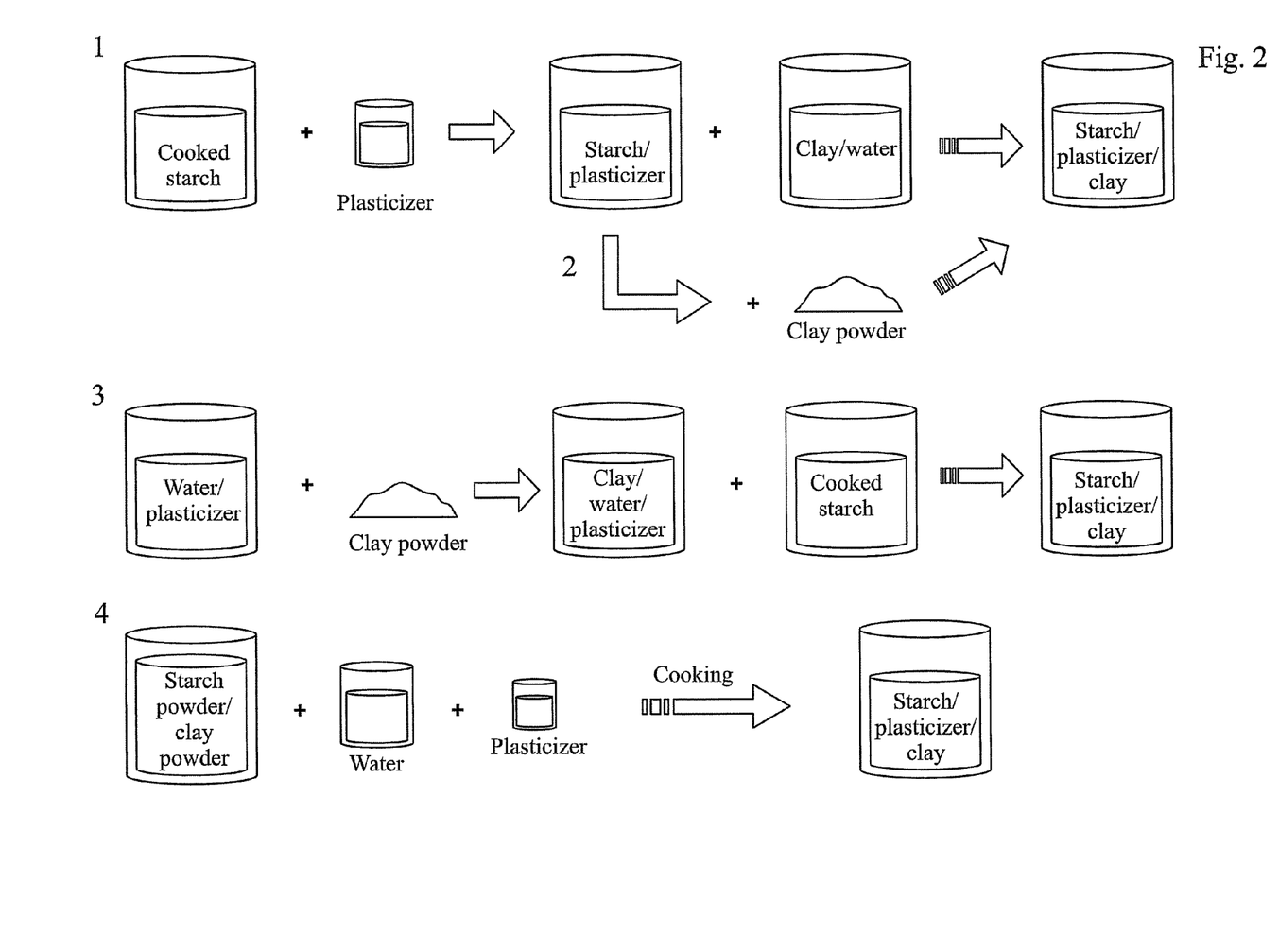
FIG. 2 shows various sequences of mixing the three components of the biopolymer based coating composition of the present invention.

Various sequences of mixing the three components were investigated and are explicitly illustrated in FIG. 2. The mixing sequences are presented as non-limiting examples of the practical use of the invention. Sequence 1 is described in Example 1-2 and the proportions between the three components are shown in Table 3a.

In Sequence 1 the OHP starch is dispersed in water and cooked, thus forming a biopolymer solution with a starch concentration of 10-30 percent by weight on dry basis. The plasticizer is then added to said biopolymer solution forming a biopolymer-plasticizer solution with a concentration of 10-30 parts plasticizer per 100 parts of biopolymer on dry basis. Finally, a water dispersion of nanoclay is added to the biopolymer-plasticizer solution.

Sequence 2 involves the dispersion of nanoclay as a dry substance (and not as a water dispersion of nanoclay as in Seq. 1), henceforth called dry nanoclay, in the OHP starch-plasticizer solution.

Sequence 3 implies dispersion of dry nanoclay in a water solution containing a pre-determined amount of plasticizer, followed by mixing the nanoclay-plasticizer-water dispersion with cooked starch to reach identical proportions of the three components as in Example 2 corresponding to 20 parts plasticizer per 100 parts of OHP starch (Table 3a, row 6). This composition was selected for investigation of mixing sequences because it showed the lowest WVTR when following Sequence 1.

Sequence 4 implies blending dry nanoclay with OHP starch in powder form, followed by addition of water and plasticizer, prior to cooking, to reach identical proportions of the three components as in Example 2 corresponding to 20 parts plasticizer per 100 parts of OHP starch (Table 3a, row 6). Coating of paperboard and measurement of WVTR was carried out as in Example 2.

Table 4 presents results on viscosity and WVTR following the specified mixing sequences (using polyethylene glycol as plasticizer). Sequence 1 is thus preferred from a viscosity perspective. Sequence 4 gives WVTR values of coated paperboard comparable to Sequence 1. In Sequence 3 (and 4) the complete delamination of clay platelets could be obstructed by the presence of plasticizer (or starch) in the water mixture.

Furthermore, the presence of nanoclay particles is suspected to impair the swelling and gelatinization of OHP starch granules during the initial cooking step according to Sequence 4. Sequence 2 resulted in a high increase in the viscosity (>6000 mPas) even at low (14 weight percent on dry basis) additions of nanoclay and hence the composition fell outside the range for making application on paper possible. The advantage with this mixing procedure is however that the total solids content of the OHP starch-plasticizer-nanoclay formulation can be raised to higher levels than with any of the other methods.

TABLE 4

Brookfield viscosity of OHP starch-plasticizer-nanoclay formulations as an effect of mixing sequence. WVTR data obtained from coated paperboard.

| Mixing Sequence | Solids, % | Viscosity, mPas | WVTR, $g/m^2 \cdot d$ |
|---|---|---|---|
| 1 | 15.4 | 1040 | 56 ± 2 |
| 3 | 17.9 | 1320 | 72 ± 1 |
| 4 | 16.1 | 1624 | 47 ± 5 |

With respect to practical utilize, appropriate viscosity range and acceptable WVTR, and lack of those problems associated with the other sequences specified above, Sequence 1 was selected as the most successful one.

An alternative mixing procedure would be to disperse nano-sized clay in water forming a water dispersion of nano-sized clay at a concentration of 5-10 percent by weight on dry basis and to dissolve the biopolymer in water forming a biopolymer solution at a concentration of 10-30 percent by weight on dry basis and then to add the biopolymer solution to the water dispersion of nano-sized clay followed by addition of the plasticizer.

Another alternative mixing procedure would be to disperse nano-sized clay at a concentration of 5-10 percent by weight on dry basis, the plasticizer is added to said water dispersion forming a water dispersion of nano sized clay-plasticizer, dissolve the biopolymer in water forming a water solution of biopolymer at a concentration of 10-30 percent by weight on dry basis followed by mixing the water solution of biopolymer with the nano sized clay-plasticizer dispersion.

The different mixing sequences result in the same final composition of the biopolymer based barrier coating composition but the viscosity of the final coating composition may differ from mixing sequence to mixing sequence as a result of in which order the components have been added.

As already mentioned, mixing Sequence 1 is preferred from a viscosity perspective for mixing the components in the desired proportion. If another mixing proportion of the ingredients is preferred, one of the other mixing sequences may be more advantageous in order to reach a viscosity within the preferred viscosity range of 500-2000 mPas.

EXAMPLE 4

Effect of Gallery Cation on Starch-Plasticizer-Nanoclay Dispersion and Coating Properties Dry blends of Na-Cloisite and Ca-Cloisite with the following Na/Ca percentage ratios were mixed: 100/0; 80/20; 60/40;

50/50; 40/60; 20/80 and 0/100. The Na/Ca-Cloisite blends were dispersed in deionized water in a dispergator. The resulting solids content was about 8% in all dispersions.

OHP starch was cooked to 20% concentration. Polyethylene glycol was added to the cooked starch solution corresponding to 20 parts polyethylene glycol per 100 parts starch on dry basis. The Na/Ca-Cloisite dispersions were added to the starch-plasticizer solution as in Example 2. The resulting compositions were 27 wt % clay, 61 wt % OHP starch and 12 wt % PEG on dry basis.

Viscosity

Figure 3:
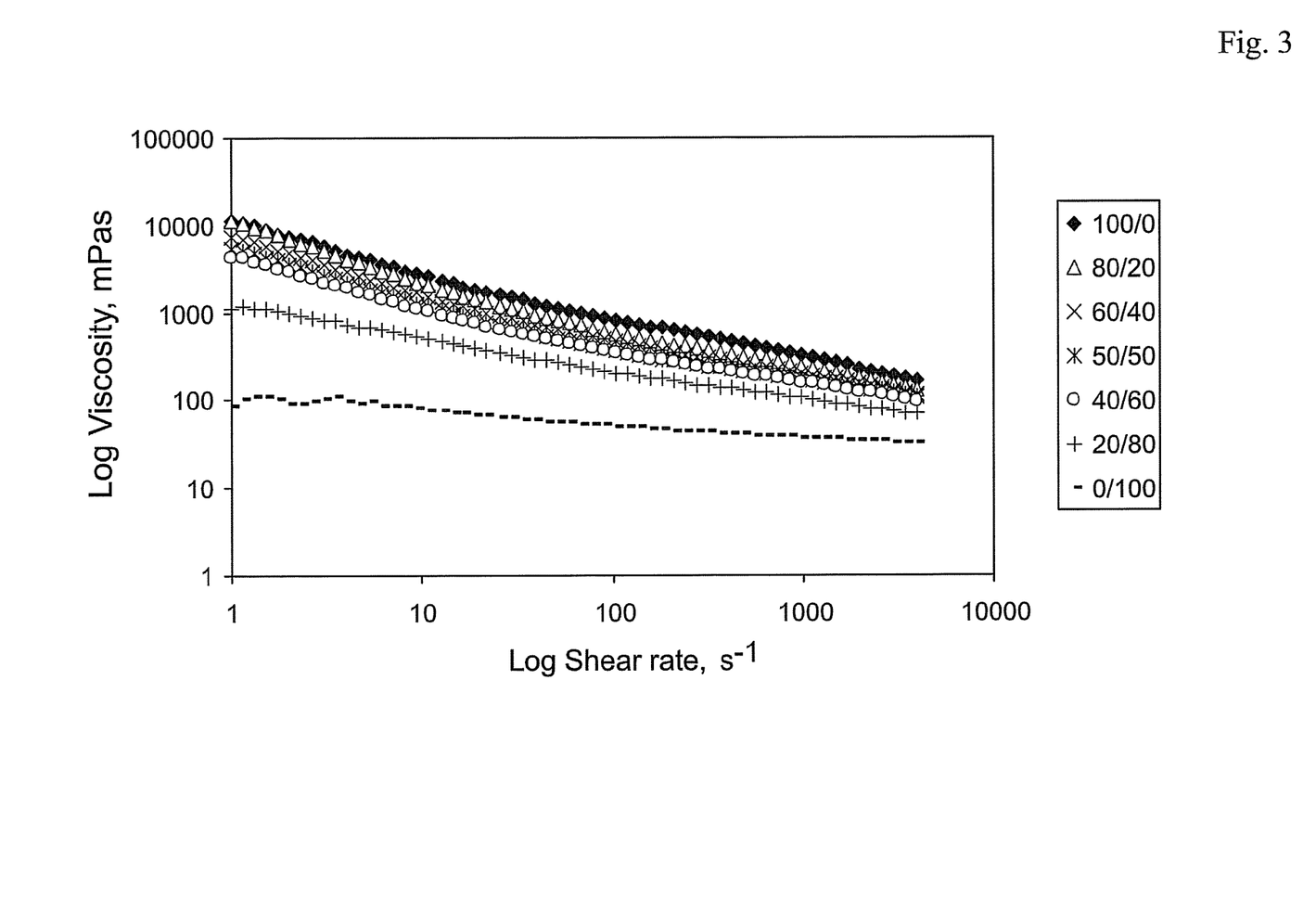
FIG. 3 shows flow curves for OHP starch-plasticizer-Na/Ca-Cloisite formulations at 60° C. and where the figure legends refer to the Na/Ca-Cloisite ratio.

The viscosity of the OHP starch-plasticizer-nanoclay dispersions were measured by a controlled shear stress rheometer (Physica MCR 300, Physica Messtechnik GmbH, Ostfildern, Germany) with shear rates from 1 to 4000 $s^{-1}$ in concentric cylinder geometry at 60° C. Flow curves are shown in FIG. 3.

All types of dispersions showed shear thinning behavior. It was anticipated that mixtures of Na- and Ca-exchanged nanoclay would exhibit a reduced viscosity which would allow higher nanoclay contents to be used. The results showed that the overall viscosity of the OHP starch-plasticizer-Na/Ca-Cloisite dispersions decreased with increasing amount of Ca-Cloisite. A remarkably large decrease in the viscosity was observed when going from 60 to 80% Ca-Cloisite and similarly when going from 80 to 100%.

Laboratory Coating and WVTR

Coating of paperboard and measurement of WVTR were carried out as in Example 2. The dry coating thickness was measured to about 15-20 μm and the coat weights were determined to about 6-8 $g/m^2$. The effect of Na/Ca-Cloisite ratio on WVTR is shown in Table 5.

TABLE 5

WVTR as an effect of Na/Ca-Cloisite ratio.

| Na/Ca-Cloisite ratio | WVTR, $g/m^2 \cdot d$ |
|---|---|
| 100/0 | 56 ± 2 |
| 80/20 | 51 ± 1 |
| 60/40 | 68 ± 4 |
| 50/50 | 58 ± 3 |
| 40/60 | 69 ± 1 |
| 20/80 | 114 ± 5 |
| 0/100 | 220 ± 3 |

In general, the WVTR was found to increase with increasing content of Ca-Cloisite. At 100% Ca-Cloisite, there is only a slight improvement of the barrier compared to the pure OHP starch coating (ca 295 $g/m^2 \cdot d$). The data suggest however, that introduction of a small amount of Ca-Cloisite (maximum 20%) may favor the water vapor barrier properties over a coating with pure Na-Cloisite.

EXAMPLE 5

Effect of Pre-Coating

The effect of Ca-Cloisite was further studied in the region between 0 and 20 wt % to validate the positive effect of a small amount of a divalent cation in the clay gallery, and to find out the optimum mixture of monovalent and divalent cations with respect to barrier properties. The proportions between nanoclay, starch and PEG was kept constant at 27:61:12 on dry basis.

The OHP starch-PEG-Na/Ca-Cloisite formulations were applied on paperboard by bench coater in a single layer of about 8-10 $g/m^2$ as described in previous examples. To study the effect of a pre-coating on the barrier performance, the formulations were applied in a single layer on top of the following substrates:

Uncoated paperboard

Pigment coated paperboard

Paperboard pre-coated with the same OHP starch-PEG-Na/Ca-Cloisite formulation; coat weight about 8-10 $g/m^2$ Paperboard pre-coated with OHP starch-plasticizer; coat weight 13 $g/m^2$ Paperboard pre-coated with a double layer of styrene-acrylate (SA) barrier latex; total coat weight 29 $g/m^2$ Paperboard pre-coated with a double layer of styrene-butadiene (SB) barrier latex filled with talc particles; total coat weight 28 $g/m^2$ Water Vapor Barrier Properties WVTR values for the pre-coated substrates and the same substrates top-coated with the different Na/Ca-Cloisite formulations are shown in Table 6. The talc-filled barrier latex shows low WVTR values and should represent one of the most efficient dispersion barriers, using non-sustainable polymer matrices, commercially available on the market today.

TABLE 6

WVTR as a function of pre-coatings of different Na/Ca-Cloisite formulations.

| | WVTR, $g/m^2 \cdot d$ | Na/Ca-Cloisite ratio | | | | |
|---|---|---|---|---|---|---|
| Substrate pre-coating | Substrate | 100/0 | 95/5 | 90/10 | 85/15 | 80/20 |
| Uncoated paperboard | 373 ± 4 | 57 ± 1 | 50 ± 2 | 54 ± 1 | 50 ± 4 | 56 ± 4 |
| Pigment coated paperboard | 341 ± 5 | 42 ± 1 | 43 ± 2 | 43 ± 2 | 42 ± 2 | 45 ± 1 |
| OHP-PEG-Na/Ca-Cloisite | — | 33 ± 5 | 29 ± 3 | 30 ± 6 | 26 ± 3 | 27 ± 2 |
| OHP-PEG | 256 ± 3 | 127 ± 10 | 125 ± 13 | 100 ± 7 | 93 ± 7 | 107 ± 5 |
| SA-latex | 65 ± 1 | 33 ± 1 | 36 ± 5 | 33 ± 3 | 31 ± 1 | 32 ± 2 |
| SB-latex (talc filled) | 17 ± 3 | 11 ± 2 | 13 ± 3 | 11 ± 3 | 13 ± 3 | 13 ± 3 |

A single layer (ca 8-10 g/m²) of OHP starch-PEG-Na/Ca-Cloisite resulted in a WVTR around 50-57 g/m²·d, irrespective of the Na/Ca-Cloisite ratio (Table 6, row 1). It is notable that these values are lower than for a double layer coating of the SA-latex (WVTR 65 g/m²·d; Table 6, row 5) despite that the coat weight of the SA-latex coating (29 g/m²) was three times higher.

Application of the OHP starch-PEG-Na/Ca-Cloisite formulations on top of a conventional pigment pre-coating has a favorable effect on the WVTR, with a 15-25% reduction. This should be due to a more surface-located barrier layer, i.e. reduced porosity of the substrate prevents too severe absorption of the barrier coating into the fiber structure.

Application of the OHP starch-PEG-Na/Ca-Cloisite formulations in two separate layers (total thickness measured to be about 30-40 μm and total coat weight determined to be about 16-20 g/m²) led to a reduction of WVTR by about 50% (Table 6, row 3). Also in this case it was found that an introduction of a small amount of Ca-Cloisite may favor the water vapor barrier properties over a coating with pure Na-Cloisite.

Application of the OHP starch-PEG-Na/Ca-Cloisite formulations on top of an OHP starch-PEG or a SA-latex pre-coating led to a reduction of WVTR by 50% as compared to the barrier level provided by these pre-coatings themselves. A slight trend towards lower WVTR values in the presence of 10 to 20% Ca-Cloisite was observed. Addition of a small amount of divalent gallery cations to the monovalent $Na^+$-ions thus improves the barrier properties.

The WVTR of the talc-filled styrene-butadiene latex coated paperboard was further reduced by application of the OHP starch-PEG-Na/Ca-Cloisite on top and these combined pre- and top coatings together give WVTR values approaching the target level of ≤10 g/m²·d set for food packaging with intermediate demand for water vapor barriers. The combination of two layers of OHP starch-PEG-Na/Ca-Cloisite (Table 6, row 3) and one layer of OHP starch-PEG-Na/Ca-Cloisite on top of a SA-latex pre-coating (Table 6, row 5) also results in acceptable WVTR values, around 30 g/m²·d. Application in two layers will, besides an increased coat weight, also promote good barrier properties by eliminating the effect of pinholes and coating defects since these will most likely not propagate through both layers. Another likely positive effect is that the presence of well-ordered clay platelets throughout the coating will increase the probability of a substantially extended pathway for diffusing water vapor, and other, molecules at all locations of ingress over the surface.

Another alternative coating approach may be to first apply a single or double layer of biopolymer based barrier coating followed by application of a layer of a barrier latex coating, i.e. a first, single or double, layer of OHP starch-PEG-Na/Ca-Cloisite is applied to the paper or paperboard followed by application of a top coating comprising a dispersion barrier latex.

The applications and coatings described above have been applied on one side of the paperboard but can of course be applied in the same way on the opposite side of a paper or paperboard resulting in paper and paperboard coated on both sides.

EXAMPLE 6

Effect of Temperature, Moisture and Mechanical Forces

The water vapor transmission rate of the most promising coatings, i.e. the OHP starch-plasticizer-nanoclay formulations applied in two layers (row 3 in Table 6) and the OHP starch-plasticizer-nanoclay formulations applied on top of the talc-filled SB-latex (row 6 in Table 6) was also measured at elevated relative humidity (23° C. and 85% RH) and at tropical conditions (38° C. and 90% RH). Both testing conditions are standard climates according to DIN 53122 and ISO 2528. In the packaging industry, the test conditions are often set to 23° C. and 85% RH to match realistic packaging environments. The tests were carried out in a climate chamber. All samples were conditioned for >12 hours in each climate before starting the test. The results are shown in Table 7 for OHP starch-plasticizer-nanoclay formulations with various Na/Ca-Cloisite ratios applied in two layers ($2^{nd}$ column) and on top of the talc filled SB-latex pre-coating ($3^{rd}$ and $4^{th}$ columns) at specified testing climates. Also given are reference data for the commercial barrier latex.

TABLE 7

Effects of temperature and relative humidity on WVTR for various OHP starch-plasticizer-nanoclay compositions.

| | WVTR, g/m²·d | | |
|---|---|---|---|
| | | SB-latex (talc filled) | |
| Na/Ca-Cloisite ratio | 23° C. 85% RH | 23° C. 85% RH | 38° C. 90% RH |
| 100/0 | 340 ± 47 | 40 ± 5 | 139 ± 2 |
| 95/5 | 133 ± 0 | 31 ± 7 | 106 ± 0 |
| 90/10 | 300 ± 1 | 35 ± 3 | 139 ± 0 |
| 85/15 | 367 ± 27 | 46 ± 9 | 169 ± 21 |
| 80/20 | 265 ± 0 | 37 ± 0 | 139 ± 42 |
| SB-latex (talc filled) | | 80 ± 5 | 217 ± 42 |

Increased temperature and humidity also increased the scatter in the data, which should be due to exaggerated impact of pinholes and coating defects (Table 7). The OHP starch/plasticizer/nanoclay coating is highly sensitive to enhanced moisture, due to the hygroscopic character of starch. Also the talc-filled SB-latex reacts strongly to increased moisture, with a 4-5 times increase in WVTR when going from 50% to 85% RH. However, the combination of a nanoclay top coating on a talc filled SB-latex pre-coating acts to keep the WVTR on a reasonable level at standard packaging testing conditions of 23° C. and 85% RH (Table 7). The tougher testing conditions however did facilitate the differentiation of inherent coating properties and a trend for lower WVTR for the coating containing 95/5 Na/Ca-Cloisite is clearly seen in all three columns in Table 7.

Effect of Creasing

Creasing tests were carried out in order to study the brittleness of the coatings, i.e. the sensitivity of barrier properties to mechanical stress applied in converting operations. A simplified creasing assembly based on the design given in the TAPPI method UM 590 "Creasing of paperboard for water vapor transmission rate (WVTR) testing" was produced. The coated paperboard samples were creased once in the machine direction by placing the coated side down on the creasing rule and then applying the upper plate on top of it. A steel roller with a weight of 10.0 kg was rolled once forwards and once backwards along the length of the plate. After removal, the creased sample was folded 180° by hand towards the coated side. The steel roll was rolled over the folded sample once again, followed by flattening of the samples and repeated testing of the water vapour barrier properties (Table 8). The results should be compared to the uncreased samples in Table 6 (third row). Also given is reference data for the commercial barrier latex.

TABLE 8

Effect of creasing on WVTR for various OHP starch-plasticizer-nanoclay formulations.

| Na/Ca-Cloisite ratio | WVTR, g/m² · d |
|---|---|
| 100/0 | 72 ± 9 |
| 95/5 | 59 ± 5 |
| 90/10 | 69 ± 5 |
| 85/15 | 70 ± 2 |
| 80/20 | 65 ± 3 |
| SB-latex (talc filled) | 30 ± 6 |

Creasing leads to a significant loss of barrier properties for both the OHP starch/plasticizer/nanoclay and the reference SB-latex barrier coatings. The data indicates however once again that the barrier properties are improved by a small addition of Ca-Cloisite, with a minimum in WVTR for the formulation with 95/5 Na/Ca-Cloisite. It is evident that enhanced moisture (Table 7) has a greater negative effect on the WVTR than has induced mechanical stress.

COMPARATIVE EXAMPLE 1

For comparison, a commercial nanocomposite coating consisting of a nanosilicate dispersed in a polyester resin (Nanolok PT 3575, InMat Inc.) was applied on top of the talc-filled SB-latex. The obtained WVTR was 9±1 g/m²·d. As evident from Table 6, some of the starch-based nanoclay coatings are tangent to these values.

Summary and Conclusions

- Double layer application seem to be more efficient for reduction of WVTR than the application of an increased thickness of an applied single layer.
- Starch-based nanoclay coatings were proven to offer competitive WVTR values when compared with commercial unfilled styrene-acrylate dispersion coatings.
- Starch-based nanoclay top coatings were shown to give the same level of water vapor barrier as commercial nanocomposite top coatings when applied on a suitable pre-coated paperboard. These combined pre- and top coatings together give WVTR values approaching the target level of ≤10 g/m²·d set for food packaging with intermediate demand for water vapor barriers.
- The surface energy of the pre-coating and the surface tension of the top coating is beneficially controlled to get optimum wetting and spreading properties of the top coating layer.
- A conventional, inexpensive pigment pre-coating strongly facilitates the barrier properties of a starch-based nanoclay coating.
- A small addition of Ca-Cloisite (5-10% by weight) has a positive effect on the WVTR of starch/plasticizer/nanoclay coatings. The effect is exaggerated at testing conditions involving enhanced temperature, enhanced moisture and induced mechanical stress (creasing).
- A higher load of nanoclay than conventional may be used.
- The successful formulation of the aqueous coating composition resulted in remarkably low WVTR values when applied on paper or paperboard.
- Very low WVTR values are achieved when applying the starch/clay nanocomposite on a barrier latex pre-coating.
- Positive synergistic effects of the plasticizer polyethylene glycol (PEG) and the controlled balance of counter ions (mixture of Na- and Ca-Cloisites) are observed.
- The nanoclay acts as a compatibiliser between starch and PEG.

It is understood that the objects of the present invention set forth above, among those made apparent by the detailed description, shall be interpreted as illustrative and not in a limiting sense.

The skilled person in the art realizes that other clays, e.g. hectorite, saponite, nontronite, vermiculite and their synthetic counterparts, may offer the same enhancement of barrier properties and still fulfill the basic principles according to this invention.

The same person also realizes that different types of coating machineries to coat the cellulose based substrate, e.g. paper or paperboard, may be used, e.g. blade, roll or curtain coating machines and still fulfill the basic principles according to the present invention.

The invention claimed is:

1. A cellulose based substrate coated with a dried biopolymer based barrier formed from a water-based coating composition comprising:
water;
a plasticizer;
water-dispersible nano-sized bentonite clay particles having one dimension that is less than 100 nanometers; and
a biopolymer comprising a native starch and/or a degraded starch and/or a chemically modified starch, wherein the nano-sized bentonite clay consists essentially of Sodium Bentonite and/or Calcium Bentonite.

2. The coated cellulose based substrate according to claim 1, wherein said nano-sized bentonite clay consists of 80-100 wt % Sodium Bentonite and 0-20 wt % Calcium Bentonite.

3. The coated cellulose based substrate according to claim 1, wherein said nano-sized bentonite clay consists of 85-100 wt % Sodium Bentonite and 0-15 wt % Calcium Bentonite.

4. The coated cellulose based substrate according to claim 1, wherein said nano-sized bentonite clay consists of 90-95 wt % Sodium Bentonite and 5-10 wt % Calcium Bentonite.

5. A cellulose based substrate coated with a dried biopolymer based barrier formed from a water-based coating composition comprising:
water;
a plasticizer;
water dispersible nano-sized bentonite clay particles having one dimension that is less than 100 nanometers; and
a biopolymer comprising a native starch and/or a degraded starch and/or a chemically modified starch.

6. The coated cellulose based substrate according to claim 5, wherein the plasticizer includes a hydrophilic plasticizer, such as a glycerol or a polyethylene glycol or a polypropylene glycol or a polyvinyl alcohol or a sorbitol or a mixture thereof.

7. The coated cellulose based substrate according to claim 5, wherein the plasticizer includes a hydrophobic plasticizer, such as diacetin or triacetin and similar compounds or a mixture thereof.

8. The coated cellulose based substrate according to claim 5, wherein said nano-sized bentonite clay consists essentially of Sodium bentonite and/or multivalent cation-exchanged bentonite.

9. The coated cellulose based substrate according to claim 5, wherein said nano-sized bentonite clay is a nano-sized montmorillonite clay.

10. The coated cellulose based substrate according to claim 5, wherein said based biopolymer barrier coating composition has an amount of nano-sized clay of 5-40 weight percent of dry matter.

11. The coated cellulose based substrate according to claim 5, wherein said based biopolymer barrier coating composition has an amount of nano-sized clay of 12-30 weight percent of dry matter.

12. The coated cellulose based substrate according to claim 5, wherein said based biopolymer barrier coating composition has an amount of nano-sized clay of 25-30 weight percent of dry matter.

13. The coated cellulose based substrate according to claim 5, wherein the proportions between the nano-sized clay, the biopolymer and the plasticizer is 20-70:20-70:5-30, based on the dry content of the biopolymer based barrier coating composition.

14. The coated cellulose based substrate according to claim 5, wherein the proportions between the nano-sized clay, the biopolymer and the plasticizer is 20-40:50-70:5-30, based on the dry content of the biopolymer based barrier coating composition.

15. The coated cellulose based substrate according to claim 5, wherein the proportions between the nano-sized clay, the biopolymer and the plasticizer is 24-30:58-64:9-15, based on the dry content of the biopolymer based barrier coating composition.

16. The coated cellulose based substrate according to claim 5, wherein the proportions between the nano-sized clay, the biopolymer and the plasticizer is 26-28:60-62:11-13, based on the dry content of the biopolymer based barrier coating composition.

17. The coated cellulose based substrate according to claim 5, wherein said biopolymer based barrier coating composition has a viscosity within the range of 500-2000 mPas.

18. The cellulose based substrate according to claim 5, wherein said cellulose based substrate is a paper or a paperboard.

19. The cellulose based substrate according to claim 5, wherein the barrier has been formed by coating the substrate with the water-based coating and allowing the water-based coating to dry.

20. The coated cellulose based substrate according to claim 5, wherein the barrier reduces the permeability of oxygen, grease and moisture through the substrate.

21. A food container comprising the cellulose based substrate according to claim 5, wherein the barrier reduces the permeability of oxygen, grease and moisture through the substrate.

22. The coated cellulose based substrate according to claim 1, wherein the plasticizer interacts with the clay particles and exerts an influence on the orientation of the clay particles in the coating.

23. The coated cellulose based substrate according to claim 5, wherein the plasticizer interacts with the clay particles and exerts an influence on the orientation of the clay particles in the coating.

* * * * *